No. 697,944. Patented Apr. 15, 1902.
F. I. JOHNSON.
CRANK SHAFT BEARING OF BICYCLES.
(Application filed Jan. 24, 1900.)
(No Model.) 2 Sheets—Sheet 1.

Witnesses:
Harry M. Rugg.
Ava F. Murphy.

Inventor:
Frederic I. Johnson
By Rufus B. Fowler
Attorney.

No. 697,944. Patented Apr. 15, 1902.
F. I. JOHNSON.
CRANK SHAFT BEARING OF BICYCLES.
(Application filed Jan. 24, 1900.)
(No Model.) 2 Sheets—Sheet 2.
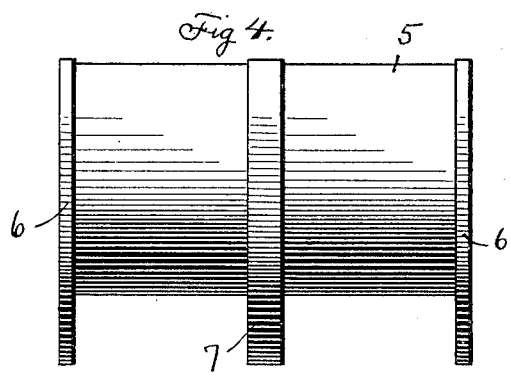
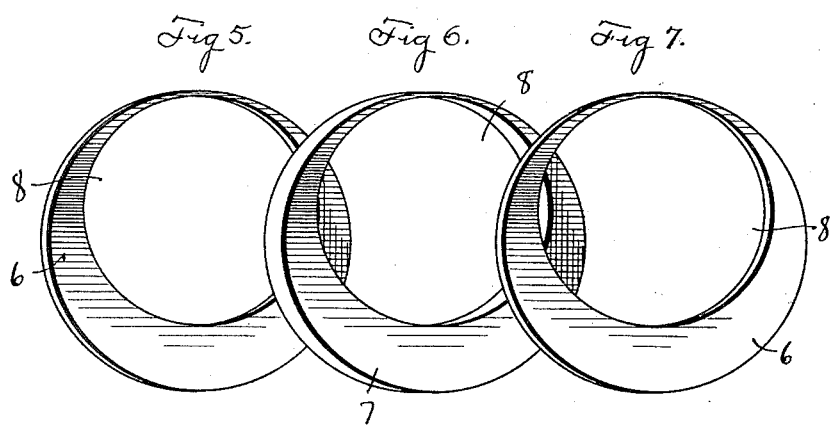
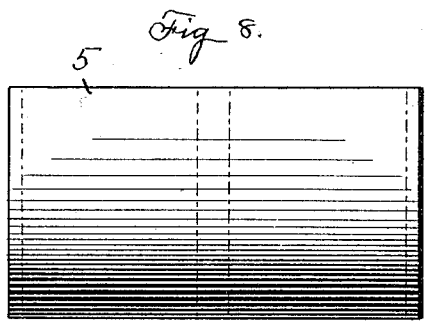

UNITED STATES PATENT OFFICE.

FREDERIC I. JOHNSON, OF FITCHBURG, MASSACHUSETTS.

CRANK-SHAFT BEARING OF BICYCLES.

SPECIFICATION forming part of Letters Patent No. 697,944, dated April 15, 1902.

Application filed January 24, 1900. Serial No. 2,607. (No model.)

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in the Crank-Shaft Bearings of Bicycles, of which the following is a specification, accompanied by drawings forming a part of the same, in which—

Figure 1:
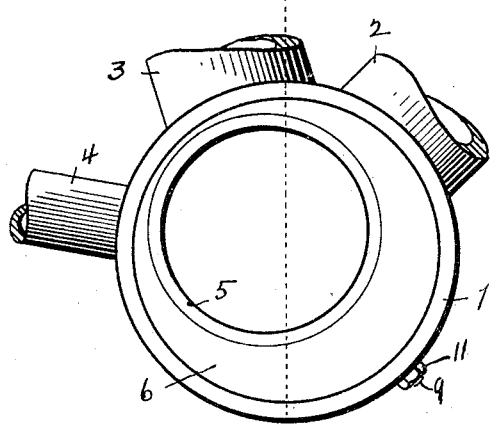
Figure 2:
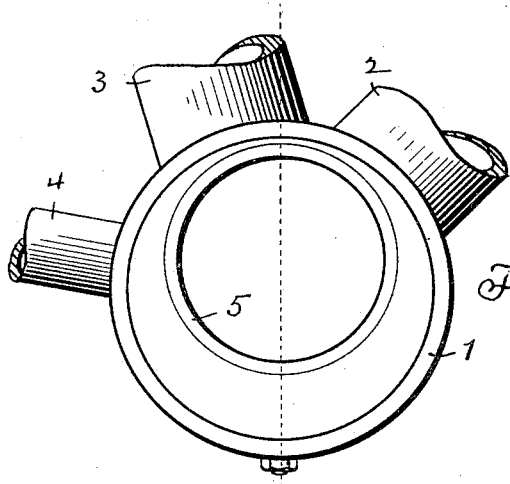
Figure 3:
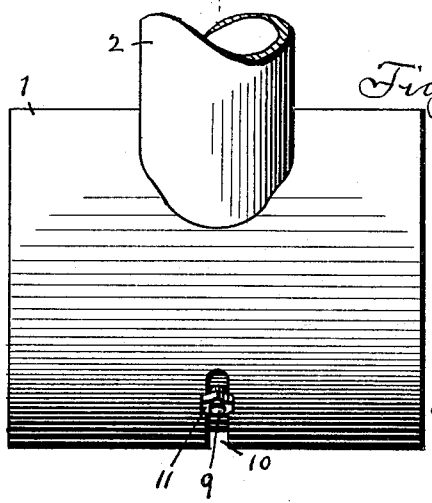

Figure 1 represents that part of a bicycle-frame known as the "crank hanger or bracket." Fig. 2 represents the same view as shown in Fig. 1, except that the sleeve which suports the crank-shaft is represented as having been turned or rotated in the crank-bracket. Fig. 3 is a front view of my improved crank-hanger. Fig. 4 is a detached view of the sleeve in which the bearings of the crank are placed, provided with eccentric rings fitting the barrel forming the crank-bracket. Figs. 5, 6, and 7 represent the eccentric rings detached from the sleeve, and Fig. 8 is a detached view of the sleeve with the position of the rings thereon represented by broken lines.

Similar reference-figures refer to similar parts in the different views.

My invention relates to that class of crank hangers or brackets in which the crank-shaft rotates within bearings held in a sleeve which is eccentrically journaled within the crank-bracket; and my invention consists in an improved method of constructing the eccentrically-journaled sleeve containing the crank-shaft. Sleeves containing a crank-shaft which is eccentrically journaled in the crank hanger or bracket of a bicycle have been heretofore made for the purpose of varying the position of the crank-shaft in order to tighten or loosen the bicycle-chain, and their use will be well understood. Such eccentrically-journaled crank sleeves or bearings have been usually made from a single piece of drop-forged steel and the surplus stock removed by milling; but this method of construction is very expensive, and my present invention consists in an improved method of construction by which the cost and weight are reduced.

Referring to the accompanying drawings, 1 represents the transverse tube known as the "crank hanger or bracket" and forming a part of the framework of the bicycle, portions of which are shown at 2, 3, and 4. Within the crank hanger or bracket 1 is held a sleeve 5, having brazed on each end a thin eccentric ring 6, and brazed to its central portion is a thick eccentric ring 7. The rings 6 6 are circular plates cut from sheet metal, fitting the crank-hanger tube 1, and are provided with eccentric holes 8, tightly fitting the periphery of the sleeve 5. The eccentric ring 7 is of similar construction, except that it is thicker, in order to give a greater bearing-surface upon the sleeve 5 and furnish sufficient stock to receive the radially-projecting screw-threaded pin or stud 9, which is screwed into the ring 7 and projects through the slot 10, formed in the crank-hanger 1, and carries a clamping-nut 11, which is screwed against the outside of the crank-hanger 1 in order to hold the crank-sleeve 5 in its desired position in the crank-hanger. By loosening the nut 11 and moving the stud the length of the slot 10 the sleeve 5 is rocked in the crank-hanger from the position shown in Fig. 1 to that shown in Fig. 2, thereby varying the axis of the sleeve 5 and changing the position of the crank, so that the sprocket-chain of the bicycle may be tightened or loosened, as desired. The rings 6 and 7 are upon the outside of the sleeve 5 and securely brazed thereto, forming an extremely light and cheaply-constructed eccentric bearing. The increased thickness of the central eccentric ring 7 affords a sufficient attachment to the sleeve 5, and as the rings 6 are only required to support the ends of the sleeve and are not subject to severe strain they are cut from lighter sheet metal. All the eccentric rings are cheaply made by stamping or punching from sheet metal and are readily brazed in position, allowing the sleeve to be finished before the rings are attached.

What I claim as my invention, and desire to secure by Letters Patent, is—

1. In a bicycle, the combination with the barrel of the crank-bracket provided with a slot, of a sleeve adapted to receive the crank-shaft, a pair of eccentric rings attached to the ends of said sleeve, a thick eccentric ring attached to the central section of said sleeve, said eccentric rings fitting the barrel of the crank-bracket, a stud projecting radially from said central ring through the slot in said barrel and a clamping-nut carried by said stud by which the sleeve is held from rotation in said barrel, substantially as described.

2. In a bicycle, the combination with the barrel of the crank-bracket provided with a slot, of a sleeve adapted to receive the crank-shaft consisting of a piece of tubing and having brazed or soldered eccentric rings fitting said barrel, with a screw-threaded stud projecting radially from one of said rings through said slot and a clamping-nut carried by said stud, substantially as described.

In testimony whereof I have signed my name to this specification, in presence of two subscribing witnesses, this the 22d day of January, 1900.

FREDERIC I. JOHNSON.

Witnesses:
J. WM. JOHNSON,
B. STODDARD.